(12) United States Patent
Wu et al.

(10) Patent No.: US 9,124,820 B2
(45) Date of Patent: Sep. 1, 2015

(54) CONTENT-BASED SECURITY PROCESSING USING DISTRIBUTED SCAN MANAGEMENT PROTOCOLS

(75) Inventors: Yuwen Wu, Sunnyvale, CA (US); Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 16 days.

(21) Appl. No.: 13/331,992

(22) Filed: Dec. 20, 2011

(65) Prior Publication Data

US 2013/0155443 A1    Jun. 20, 2013

(51) Int. Cl.
H04N 1/193    (2006.01)
H04N 1/32    (2006.01)
H04N 1/00    (2006.01)

(52) U.S. Cl.
CPC ....... H04N 1/32545 (2013.01); H04N 1/00838 (2013.01)

(58) Field of Classification Search
None
See application file for complete search history.

(56) References Cited

U.S. PATENT DOCUMENTS

| | | | |
|---|---|---|---|
| 2006/0215208 A1* | 9/2006 | Takayama | 358/1.14 |
| 2006/0290967 A1* | 12/2006 | Sumitomo et al. | 358/1.14 |
| 2007/0177192 A1 | 8/2007 | Wang | |
| 2009/0219561 A1* | 9/2009 | Kozuka | 358/1.14 |
| 2009/0240697 A1 | 9/2009 | Fenelon | |
| 2009/0290190 A1* | 11/2009 | Torii | 358/1.15 |
| 2010/0157349 A1* | 6/2010 | Hong | 358/1.14 |
| 2011/0149352 A1* | 6/2011 | Ding | 358/474 |
| 2012/0194837 A1 | 8/2012 | Kamata | |
| 2013/0215453 A1 | 8/2013 | Yi Ding et al. | |
| 2013/0222861 A1 | 8/2013 | Yi Ding et al. | |

OTHER PUBLICATIONS

Microsoft, "Distributed Scan Device Web Service Protocol Summary", http://msdn.microsoft.com/en-us/library/windows/hardware/ff540604(v= . . . , 3 pages, dated 2011.
Microsfot, "Distributed Scan Processing Web Service Protocol Summary", http://msdn.microsoft.com/en-us/library/windows/hardware/ff540624(v= . . . , 3 pages, dated 2011.
U.S. Appl. No. 13/398,704, filed Feb. 16, 2012, Final Office Action, Jun. 24, 2014.

(Continued)

*Primary Examiner* — Benny Q Tieu
*Assistant Examiner* — Haris Sabah
(74) *Attorney, Agent, or Firm* — Hickman Palermo Becker Bingham LLP; Edward A. Becker

(57) ABSTRACT

A method and apparatus is provided for processing acquired document data, using distributed scan management protocols, according to a security classification of the data. A scanning device through which the document data is acquired includes a distributed scan management service that implements a distributed scan device protocol and a distributed scan processing protocol. In embodiments of the invention, the distributed scan device protocol and the distributed scan processing protocol are implemented using Web services. The distributed scan management service is configured to receive information for post scan processing instructions. The scanning device also includes a scan service configured to scan a document and generate scan data based on the document scan. The scanning device further includes a security handler service that is configured to identify a security classification for the scan data, and perform one or more actions, associated with the security classification, for the scan data.

17 Claims, 7 Drawing Sheets

(56) References Cited

OTHER PUBLICATIONS

Mike Fenelon and Erhan Soyer-Osman: "Distributed Scan Management", Internet Citation, dated Nov. 6, 2008, 25 pages.

Hameed: "Windows 7 / Windows Server, 2008, R2: Distributed Scan Management", dated Oct. 11, 2009, 4 pages.

European Patent Office, "Search Report" in application No. 12198673.1-1903, dated Sep. 1, 2014, 7 pages.

\* cited by examiner

FIG. 3

| Security code 330 | Security Level 340 | Security violation 350 | Action 360 | Action code 370 | Action Parameters 380 |
|---|---|---|---|---|---|
| 312 — 001 | Confidential | PSP contains external email | Email | 1 | It_admin@abc.com; communications@abc.com |
| 314 — 002 | Copyrighted | | Email | 1 | It_admin@abc.com |
| 316 — 003 | Illegal | | Stop | 0 | |
| 318 — 004 | Confidential | | Email | 1 | It_admin@abc.com |
| 320 — 005 | Sensitive | | Notify-Fax | 2 | 555-222-1111 |

| Job ID 520 | User 530 | PSP 540 | Path of saved scan data 550 | Status 560 | Status Code 570 | Create Time 580 |
|---|---|---|---|---|---|---|
| 1 | test1 | ... | \\hdd\temp\001.tif | Ready | 0 | 08/08/2011 15:00:00 |
| 2 | Test2 | ... | \\hdd\temp\002.tif | To be Approved | 1 | 08/08/2011 15:30:00 |
| 3 | Test3 | ... | \\hdd\temp\003.tif | Cancel | 2 | 08/08/2011 15:35:00 |

500

512 — row 1
514 — row 2
516 — row 3

CONTENT-BASED SECURITY PROCESSING USING DISTRIBUTED SCAN MANAGEMENT PROTOCOLS

CROSS-REFERENCE TO RELATED APPLICATIONS

This application is related to U.S. patent application Ser. No. 13/398,704, filed Feb. 16, 2012, entitled "Additional Input Sources For Data Acquisition At Distributed Scan Management Systems". This application is also related to U.S. patent application Ser. No. 13/406,401, filed Feb. 27, 2012, entitled "Quotas In Distributed Scan Management Systems".

FIELD OF THE INVENTION

The present invention relates to controlling processing, of acquired document data by an enterprise scanning system, based at least in part on a security classification of the acquired document data.

BACKGROUND

An enterprise scanning system implements protocols that allow for entities to route documents that enter the system via a scanning device according to rules determined by system administrators and/or users of scanning devices. An example enterprise scanning system is Distributed Scan Management (DSM) implemented by Microsoft and deployed in Windows 7/Windows 2008 Server R2.

An enterprise scanning system that is implemented using DSM (a "DSM system") allows a user to authenticate user data via a DSM scanning device and to select from one or more sets of post scan processing instructions that are made available to the user. A set of post scan processing instructions (PSP) contains instructions for routing acquired documents, including one or more destinations to which acquired document data should be sent. For example, a PSP may indicate that acquired document data should be emailed to one or more email addresses, copied to one or more specified file servers, uploaded to one or more specified websites, etc. A PSP may also include, among other things, settings for data acquisition such as color style, acquisition resolution, file format type, etc.

After a user is authenticated and has selected a PSP, the user may introduce a document to the system, e.g., by scanning document data into the system at a DSM scanning device. The DSM system routes the acquired document data according to the selected PSP.

DSM systems process and disseminate acquired document data regardless of a security classification of the data, which may be inappropriate if there is a security issue with the acquired data. To illustrate, because scanning currency is illegal, there is a security issue when a user scans currency. In this situation, it would be more appropriate to delete the scanned currency data than to disseminate the scanned currency data according to the PSP selected by the user for the scan data. Thus, it would be advantageous for a DSM system to allow administrators to manage acquired document data according to a security classification of the data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An approach is provided for processing acquired document data based, at least in part, on a security classification of the data. A scanning device through which the document data is acquired includes a distributed scan management service that implements a distributed scan device protocol and a distributed scan processing protocol. In embodiments, the distributed scan device protocol and the distributed scan processing protocol are implemented using Web services. The distributed scan management service is configured to receive information for post scan processing instructions. The scanning device also includes a scan service configured to scan a document and generate scan data based on the document scan. The scanning device further includes a security handler service that is configured to identify a security classification for the scan data, and to perform one or more actions, associated with the security classification, for the scan data.

In embodiments, the security handler is further configured to add a job for the scan data into a job queue, which job includes information for the scan data. In such embodiments, the scanning device includes a job handler service configured to identify a status of the job in the job queue and perform one or more actions based on the status of the job. In further embodiments, the job handler service is configured to, responsive to identifying the status of the job as a ready status: cause the scan data and information for the post scan processing instructions to be sent to a scan server; and remove the job from the job queue. In further embodiments, the job handler service is configured to remove the job from the job queue responsive to identifying the status of the job as a cancel status.

Embodiments include the security handler service further configured to identify a particular security rule that is associated with the security classification and perform the one or more actions associated with the security classification based, at least in part, on the particular security rule. In embodiments, the security handler is further configured to request confirmation for processing the scan data, receive confirmation for processing the scan data, and change the status of the job in the job queue to reflect the confirmation for processing the scan data.

In a further embodiment, the security handler service is configured to identify two or more security rules that are associated with the security classification, and select the particular security rule, associated with an instruction included in the post scan processing instructions, from the two or more security rules.

BRIEF DESCRIPTION OF THE DRAWINGS

In the drawings:

FIG. 3 illustrates an example security table storing a set of security rules.

FIG. 5 illustrates an example job queue.

DETAILED DESCRIPTION

Figure 1:
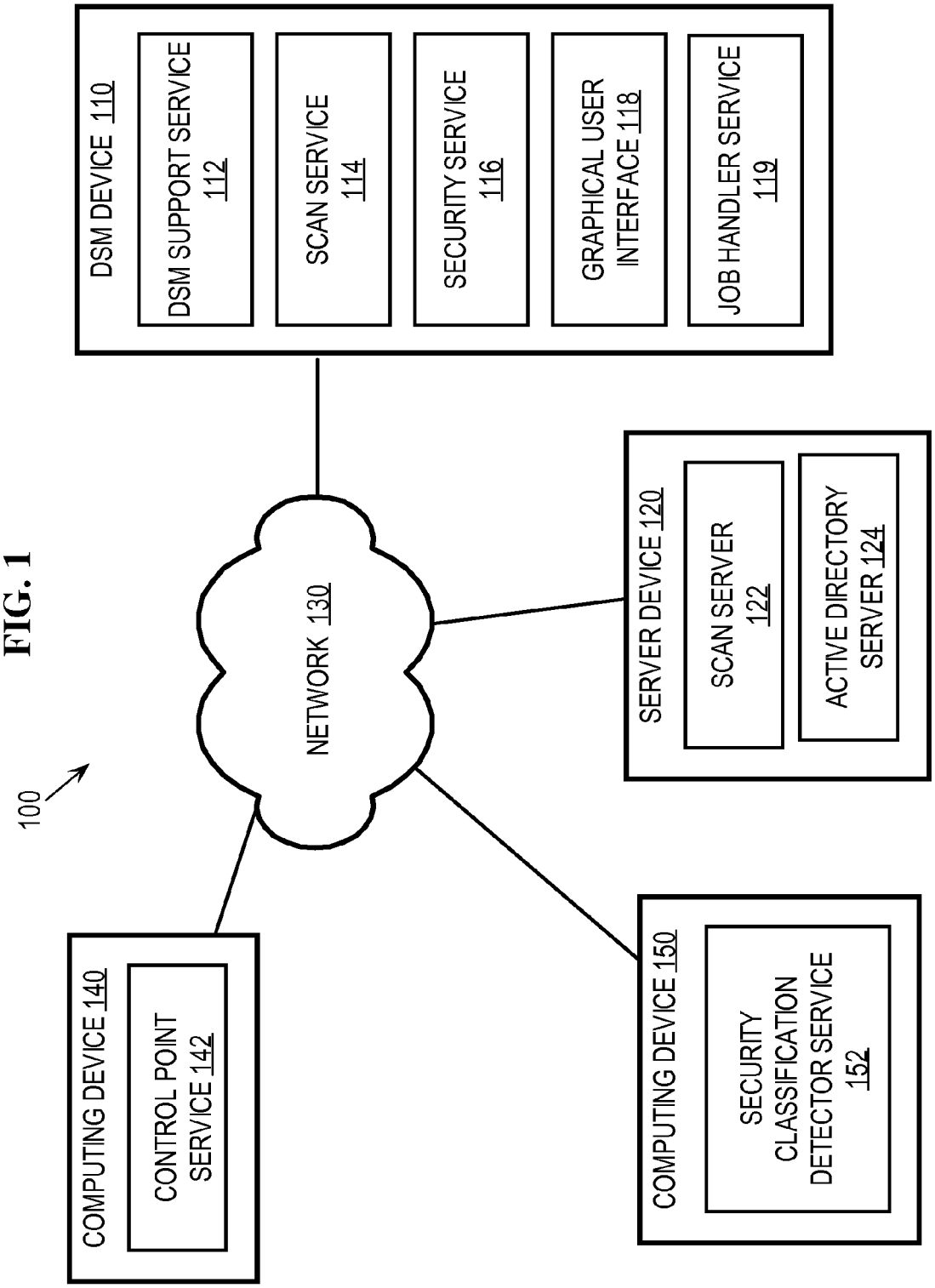
FIG. 1 is a block diagram that depicts an example network arrangement for processing acquired document data based, at least in part, on a security classification of the data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An approach is provided for processing acquired document data based, at least in part, on a security classification of the data. A scanning device through which the document data is acquired includes a distributed scan management service that implements a distributed scan device protocol and a distributed scan processing protocol. In embodiments, the distributed scan device protocol and the distributed scan processing protocol are implemented using Web services. The distributed scan management service is configured to receive information for post scan processing instructions. The scanning device also includes a scan service configured to scan a document and generate scan data based on the document scan. The scanning device further includes a security handler service that is configured to identify a security classification for the scan data, and to perform one or more actions, associated with the security classification, for the scan data.

In embodiments, the security handler is further configured to add a job for the scan data into a job queue, which job includes information for the scan data. In such embodiments, the scanning device includes a job handler service configured to identify a status of the job in the job queue and perform one or more actions based on the status of the job. In further embodiments, the job handler service is configured to, responsive to identifying the status of the job as a ready status: cause the scan data and information for the post scan processing instructions to be sent to a scan server; and remove the job from the job queue. In further embodiments, the job handler service is configured to remove the job from the job queue responsive to identifying the status of the job as a cancel status.

Embodiments include the security handler service further configured to identify a particular security rule that is associated with the security classification and perform the one or more actions associated with the security classification based, at least in part, on the particular security rule. In embodiments, the security handler is further configured to request confirmation for processing the scan data, receive confirmation for processing the scan data, and change the status of the job in the job queue to reflect the confirmation for processing the scan data.

In a further embodiment, the security handler service is configured to identify two or more security rules that are associated with the security classification, and select the particular security rule, associated with an instruction included in the post scan processing instructions, from the two or more security rules.

A user administrator may manage processing of acquired document data based on security classifications of the data through definition of security rules. For example, a security rule may indicate that acquired document data with a first security classification requires email confirmation prior to processing the acquired document data. Further, a security rule may indicate that acquired document data with a second security classification must be cancelled without further processing the data. Thus, processing of acquired document data may be managed in an enterprise scanning system based on security classifications of the data.

Architecture for Processing Acquired Document Data

FIG. 1 is a block diagram that depicts an example network arrangement 100 for processing acquired document data based, at least in part, on a security classification of the data, according to embodiments. Network arrangement 100 includes a DSM device 110, a server device 120, and computing devices 140 and 150, communicatively coupled via a network 130. In example network arrangement 100, DSM device 110 is configured to acquire document data, determine a security classification for the acquired data, and manage processing of the acquired data based, at least in part, on the security classification as described in further detail below.

DSM device 110 may be implemented by any type of device that is capable of acquiring document data and implementing a distributed scan device protocol and a distributed scan processing protocol. A description of a distributed scan device protocol may be found at "en-us/library/windows/hardware/ff540604%28v=VS.85%29.aspx" on the server "msdn.microsoft.com", the contents of which are incorporated by reference as if fully set forth herein. Further, a description of a distributed scan processing protocol may be found at "en-us/library/windows/hardware/ff540624%28v=VS.85%29.aspx" on the server "msdn.microsoft.com", the contents of which are also incorporated by reference as if fully set forth herein.

In example network arrangement 100, DSM device 110 is configured with a DSM support service 112, a scan service 114, a security service 116, a graphical user interface 118, and a job handler service 119. DSM device 110 may be configured with other mechanisms, processes and functionality, depending upon a particular implementation. The approaches described herein for processing acquired document data are not limited to any particular type of DSM device or network configuration. For example, implementations of DSM device 110 may include a scanning device and a multi-function peripheral (MFP) that performs any combination of printing, copying, facsimile, and scanning, etc. Any number of devices, including printing devices, scanning devices, client devices, administrative console devices, and other computing devices, may be included in the network.

DSM support service 112 may be implemented by one or more processes, and communicates with other applications and network devices. These communications include communications via (a) a distributed scan device protocol to communicate with a control point, e.g., control point service 142 of computing device 140; and (b) a distributed scan processing protocol to communicate with a scan server, e.g., scan server 122 of server device 120. In an embodiment, one or more of the protocols implemented by DSM support service 112 are performed using Web services. In an embodiment, all of the communications made by DSM device 110 is done using Web services. In these embodiments, DSM support service 112, scan server 122, Active Directory server 124, and control point service 142 implement one or more Web services protocols such as WS-Discovery, WS-Eventing, and WS-MetadataExchange, described in more detail below.

Scan service 114 is implemented by one or more processes for acquiring document data via a scanning device at DSM device 110 or made available to DSM device 110, e.g., via network 130. Security service 116 is implemented by one or more processes configured to detect a security classification for acquired document data and perform one or more actions, associated with the security classification, for the document data, as described in further detail below. Job handler service 119 is implemented by one or more processes configured to manage and dispatch scan data jobs in a job queue, and is also described in further detail below. The services attributed to DSM device 110 in example network arrangement 100 are illustrative and the functions attributed to these services may be performed by any logical module at DSM device 110.

DSM support service 112, scan service 114, security service 116, and job handler service 119 may be implemented as resident processes on DSM device 110. Alternatively, one more of DSM support service 112, scan service 114, security service 116, and job handler service 119 may be made available to DSM device 110 on removable media or may be implemented at a remote location with respect to DSM device 110. Also, DSM support service 112, scan service 114, security service 116, and job handler service 119 may be implemented as plug-ins, or in hardware, software, or any combination of hardware or software, depending upon a particular implementation.

DSM device 110 is further configured with graphical user interface 118. Graphical user interface 118 may be displayed at a display device associated with DSM device 110. A display device may be a monitor, a screen on DSM device 110, etc. Graphical user interface 118 may be implemented in a browser, as a stand-alone application, etc., and may be managed by any service at DSM device 110.

Network 130 may be implemented with any type of medium and/or mechanism that facilitates the exchange of information between DSM device 110, server device 120, and computing devices 140 and 150. Furthermore, network 130 may use any type of communications protocol, and may be secured or unsecured, depending upon the requirements of a particular embodiment.

Server device 120 may be implemented by any type of device that is capable of communicating with DSM device 110 and/or computing device 140 over network 130. In example network arrangement 100, server device 120 is configured with scan server 122 and Active Directory server 124, described in further detail below. Server device 120 may be configured with other mechanisms, processes and functionality, depending upon a particular implementation. In embodiments, scan server 122 and Active Directory server 124 are implemented as resident processes on Server device 120. In other embodiments, one or more of scan server 122 and Active Directory server 124 are made available to server device 120 on removable media or may be implemented at a remote location with respect to server device 120. Also, scan server 122 and Active Directory server 124 may be implemented as plug-ins, or in hardware, software, or any combination of hardware or software, depending upon a particular implementation.

Computing devices 140 and 150 may be implemented by any type of computing device that is capable of communicating with DSM device 110 and/or server device 120 over network 130. In example network arrangement 100, computing device 140 is configured with control point service 142, described in further detail below. Also in example network arrangement 100, computing device 150 is configured with a security classification detector service 152 that may be utilized by security service 116 on DSM device 110. In another embodiment, DSM device 110 is configured with a security classification detector service 152. As such, descriptions herein of security classification detector service 152 may refer to either embodiment. Computing devices 140 and 150 may be configured with other mechanisms, processes and functionalities, depending upon a particular implementation.

DSM Communications and Data Processing Flow

DSM device 110 is considered to be a DSM-type device because DSM device 110, via DSM support service 112, communicates with control point service 142 using a distributed scan device protocol and with scan server 122 using a distributed scan processing protocol. In an embodiment, DSM support service 112 communicates with Active Directory server 124 via Lightweight Directory Access Protocol (LDAP).

Control point service 142 allows administrators to define PSPs and associate defined PSPs with one or more users or user groups. Control point service 142 causes information for the PSPs to be made accessible to Active Directory server 124. For example, control point service 142 stores PSP information at memory for server device 120 that is accessible by Active Directory server 124. In an embodiment, control point service 142 communicates with Active Directory server 124 via LDAP.

A user may input user authentication information (e.g., username and password) into graphical user interface 118 at DSM device 110. DSM support service 112 authenticates the user information with Active Directory server 124. Once the user is authenticated, DSM support service 112 retrieves a list of PSPs, which are available to the user, from Active Directory server 124 and displays the list to the user at graphical user interface 118.

Through graphical user interface 118, DSM support service 112 receives the user's selection of PSP of the list of PSPs, and the selected PSP is designated to be the processing instructions for document data that the user causes DSM device 110 to acquire. In an embodiment, the user scans a document at a scanning device for DSM device 110 and scan service 114 produces scan data for the document. However, embodiments of the invention are not limited to processing document data that is acquired via scanning. For example, DSM device 110 may acquire document data through electronic transfer of the data from a storage or computing device, through fax, or in any other manner. References herein to scan data do not limit the embodiments of the invention to acquiring data via scanning, but are used for ease of explanation.

Scan service 114 applies scan settings included in the selected PSP to document scans requested by the user. Also, if the selected PSP includes other data acquisition settings that are applicable to the manner of data acquisition used to acquire the document data, such settings are applied to the data acquisition. As described in further detail below, a component of DSM device 110, e.g., DSM support service 112, scan service 114, security service 116, job handler service 119, etc., may send the scan data with the selected PSP to scan server 122, which processes the scan data according to the selected PSP.

Web Services

The World Wide Web Consortium (W3C), which is an international consortium that develops standards for the World Wide Web, defines a "Web service" as a software system that is designed to support interoperable machine-to-machine interaction over a network. This definition encompasses many different systems, but in common usage, the term refers to those services that use Simple Object Access Protocol (SOAP)-formatted Extensible Markup Language (XML) envelopes and that have interfaces described using Web Services Description Language (WSDL). Web services allow devices and applications to communicate with each other over one or more networks without the intervention of any human being, while using the same suite of protocols (e.g., Hypertext Transfer Protocol (HTTP)) that a human being would use to communicate with such devices and applications over the one or more networks.

SOAP is an XML-based, extensible message envelope format, with bindings to underlying protocols (e.g., HTTP and Simple Mail Transfer Protocol (SMTP)). Using XML, SOAP defines how messages should be formatted, so that those messages are formatted in such a way that the recipients of those messages (devices and applications) can understand the messages. SOAP can be used to perform remote procedure calls, for example.

WSDL is an XML format that allows Web service interfaces to be described along with the details of those interfaces' bindings to specific protocols. WSDL is typically used to generate server and client code, and for configuration.

Thus, common core specifications of Web services are SOAP, and WSDL, as well as WS-Discovery, WS-MetadataExchange, WS-Eventing, and WS-Addressing.

Processing Acquired Document Data Based on Security Classifications

Figure 2:
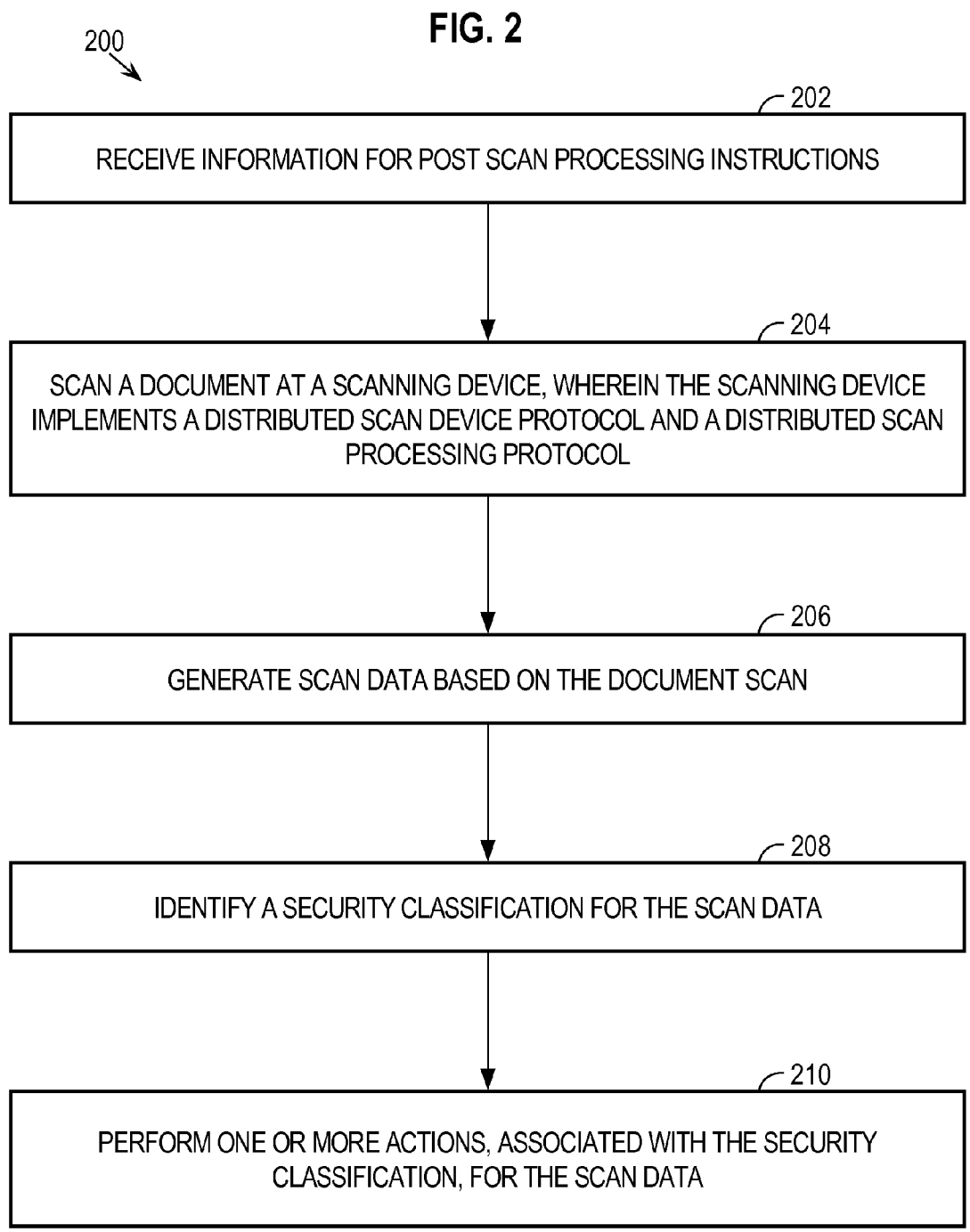
FIG. 2 illustrates a flowchart for detecting a security classification for scan data and performing one or more actions on the scan data based on the security classification.

Referring to FIG. 1, once DSM device 110 has acquired the data to be processed, e.g., via scanning a document, security service 116 detects a security classification for the scan data and performs one or more actions on the scan data based, at least in part, on the security classification. FIG. 2 illustrates a flowchart for detecting a security classification for scan data and performing one or more actions on the data. At step 202, information for post scan processing instructions are received. For example, DSM support service 112 receives a user's selection of a PSP as described above. In this example, the selected PSP includes instructions to send scan data to a particular destination for storage, to email the scan data to the authenticated user, and pre-defined scan settings that will cause scan service 114 to capture the content of the scan data as a black and white Portable Document Format (PDF) file. DSM support service 112 may receive information for a user's PSP selection before or after scan service 114 generates scan data based on the document scan.

At step 204, a document is scanned at a scanning device, wherein the scanning device implements a distributed scan device protocol and a distributed scan processing protocol. Continuing with the previous example, the authenticated user requests DSM device 110 to scan a document provided to DSM device 110 by the user. In response to this request, DSM device 110 scans the document using any pre-defined scan settings in the selected PSP.

At step 206, scan data is generated based on the document scan. For example, scan service 114 generates scan data based on the document scan performed at DSM device 110. Such scan data may include one or more of an image of the scanned document, a reference to a storage location for an image of the scanned document, and other information for the scanned document. According to the previous example, scan service 114 stores an image of the scanned document as a black and white PDF file.

At step 208, a security classification for the scan data is identified. For example, scan service 114 notifies security service 116 that scan data has been generated based on the document scan and is ready for a security classification. In one embodiment, security service 116 is associated with an Application Programming Interface (API). According to this embodiment, to notify security service 116 that scan data is ready for a security classification, scan service 114 calls an API function of security service 116 and passes the scan data to security service 116.

In one embodiment, when security service 116 is notified of scan data that requires a security classification, security service 116 requests security classification detector service 152 to detect a security classification for the scan data. In connection with such a request, security service 116 may send scan data to security classification detector service 152, or may send a reference to where the scan data is stored. Upon receipt of the request to classify scan data, security classification detector service 152 inspects the content of the scanned document represented in the scan data to determine a security classification for the scan data. After security classification detector service 152 has determined a security classification for the scan data, security classification detector service 152 returns the security classification to security service 116.

The following are non-limiting examples of security classifications that may be detected by security classification detector service 152, and bases for such detections. Security classification detector service 152 may assign a "Copyrighted" security classification to the scan data, e.g., based on a copyright notice in the content of the scanned document. Security classification detector service 152 may assign an "illegal" security classification to the scan data based on detecting that the content of the scanned document is not legal to scan, e.g., the content includes currency, or other bank notes. Furthermore, security classification detector service 152 may assign a "Confidential" security classification to the scan data, e.g., based on a watermark detected in the content of the scanned document, based on detecting that the scanned document contains an email, based on detecting that the scanned document is a legal-style document such as a contract, based on detecting that the scanned document includes a code that marks the document as confidential, etc.

At step 210, one or more actions, associated with the security classification, are performed for the scan data. To illustrate, in response to receiving the scan data security classification, security service 116 retrieves a set of rules for performing actions on security-classified scan data. The set of rules may be stored as a security table, and is referred to as such for ease of explanation. In one embodiment, the one or more actions include inserting a job for the scan data into a job queue.

Security Table

FIG. 3 illustrates an example security table 300 storing non-limiting examples of security rules 312-320. An administrator user may define the security rules in security table 300, e.g., via graphical user interface 118, or via an administrator control point such as control point service 142. Security table 300 may be stored at DSM device 110, or may be stored at a computing device accessible by DSM device 110. In one embodiment, if security table 300 is stored at DSM device 110, then only services of DSM device 110 access security table 300. If security table 300 is stored at a computing device that is accessible to multiple DSM devices, then the rules defined in security table 300 may be used by multiple DSM devices having access the table.

Security rules 312-320 include security levels that derive from security classifications that may be returned by a security classification detector service (152 of FIG. 1) and one or more actions to be performed when a rule is mapped to scan data based, at least in part, on a security classification for the scan data. A security level may be derived from a security classification based on a security level table that maps security levels to security classifications returned by security classification detector service 152. Furthermore, the name of a security level may be the same as the name of the corresponding security classification returned by security classification detector service 152, and is thus derived from the security classification. In the embodiments described below, for ease of explanation, the name of a security level is the same as the name of the corresponding security classification.

In security table 300, security code column 330 stores unique identifiers for security rules 312-320. Security level column 340 stores security classifications associated with the various security rules 312-320. Security violation column 350 stores further information identifying scan data (and/or a selected PSP) that should map to the various security rules 312-320. Action column 360 stores identifiers of actions to be performed for scan data that maps to the various security rules 312-320. Action code column 370 stores unique identifiers for associated actions indicated in action column 360. Action parameters column 380 stores information that is needed for actions indicated in action column 360. Security table 300 may include information not shown in FIG. 3 or may omit columns shown in FIG. 3, depending upon a particular implementation.

Figure 4:
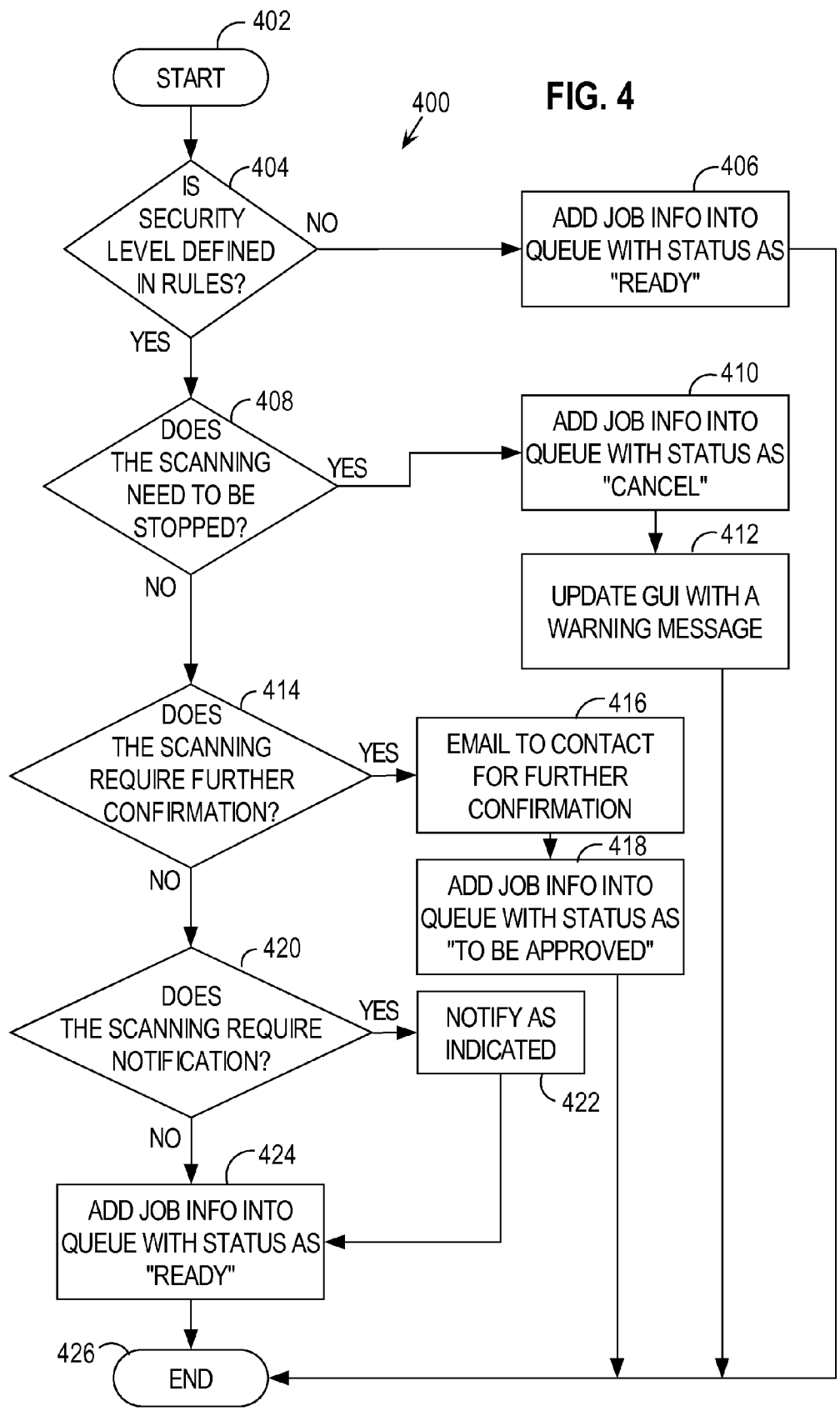
FIG. 4 illustrates a flowchart for performing one or more actions based on the rules in a security table.

FIG. 4 illustrates a flowchart for performing one or more actions based on security rules, such as security rules 312-320. At step 402, the flowchart begins. At step 404, it is determined whether a security level derived from a security classification assigned to scan data is defined in the security rules. For example, security classification detector service 152 returns a security classification of "no classification" to security service 116 in connection with the scan data. Security service 116 determines that none of security rules 312-320 (FIG. 3) in security table 300 are associated with a security level (column 340) of "no classification". Such a security classification may be assigned to the scan data because security classification detector service 152 detected no security issues with the contents of documents represented in the scan data.

Furthermore, the scan data maps to a security level included in one or more rules in security table 300, but does not match the security violation information for any of the one or more rules with the appropriate security level (as described in further detail below), then it is considered that the security level for the scan data is not found in security table 300.

Because the security classification returned by security classification detector service 152 is not associated with any security rule in security table 300, control passes to step 406, at which point job information is added into a job queue with a status as "Ready". For example, security service 116 inserts a job for the scan data into a job queue for DSM device 110, where the job has a "Ready" status.

FIG. 5 illustrates an example job queue table 500. Job queue table 500 includes non-limiting examples of information that may be included in scan data jobs 512-516. Job ID column 520 stores unique identifiers for the various scan data jobs 512-516. User column 530 stores identifiers of a user that caused the various scan data jobs 512-516 to be included in job queue table 500. PSP column 540 stores post scan processing instructions for the various scan data jobs 512-516. PSP column 540 may store the post scan processing instructions, or may store a reference to where post scan processing instruction information is stored. Path of saved scan data column 550 stores references to where scan data associated with the various scan data jobs 512-516 are stored. Status column 560 stores the status of the various scan data jobs 512-516. Status code column 570 stores a status code that uniquely identifies the associated status (column 560). Create time column 580 stores timestamps that encode dates and times that the various scan data jobs 512-516 were created.

Continuing with the example given in connection with step 406, security service 116 creates and inserts scan data job 512 into job queue table 500 with information for the scan data that received a security classification of "no classification". After scan data job 512 is inserted into job queue table 500, control passes to step 426 at which point flowchart 400 ends. Management of job queue table 500 and dispatch of the jobs therein is described in further detail below.

As another example to illustrate flowchart 400, security classification detector service 152 returns a security classification of "illegal" to security service 116 in connection with the scan data. At step 404, security service 116 identifies whether one or more of security rules 312-320 (FIG. 3) are associated with the returned security classification. In the case of an "illegal" security classification, security service 116 identifies security rule 316 as having a security level (column 340) of "illegal". As there is a single security rule identified by the returned security classification, security service 116 maps the scan data to the identified security rule 316. Control passes to step 408.

At step 408, it is determined whether the scanning needs to be stopped. For example, security service 116 determines that the action (column 360) for security rule 316 is "Stop", or action code (column 370) "0". Therefore, security service 116 determines that the scanning needs to be stopped, or in other words, the scan data cannot be processed as instructed by the user. Security service 116 may determine that other action types require the scanning to be stopped. For example, an action that may be included in action column 360, "Stop/Email", may require the scanning to be stopped and an email to be sent out with information about the scan, etc. Control passes to step 410 as a result of security service 116 determining that the scanning needs to be stopped.

At step 410, job information is added into a job queue with a status as "Cancel". For example, security service 116 creates scan data job 516 with a status of "Cancel" and with information for the scan data and inserts scan data job 516 into job queue table 500.

After the scan data job 516 is inserted into job queue table 500, control passes to step 412, at which point a graphical user interface is updated with a warning message. For example, security service 116 causes graphical user interface 118 to display a message that indicates that the scan has been stopped. Such a message may include the security classification identified for the scan data (e.g., "Illegal"), and may include any other information, such as contact information for a person that the user may contact for assistance, an image for the scan data, etc. After security service 116 displays the warning message, control passes to step 426 at which point flowchart 400 ends.

As yet another example to illustrate flowchart 400, security classification detector service 152 returns a security classification of "Copyrighted" to security service 116 in connection with the scan data. At step 404, security service 116 identifies whether one or more of security rules 312-320 (FIG. 3) are associated with the returned security classification. For example, security service 116 identifies security rule 314 having a security level (column 340) of "Copyrighted".

Since the security classification of the scan data is defined in security table 300, control passes to step 408, where it is determined whether the scanning needs to be stopped. Security service 116 determines that the action (column 360) for security rule 314 is "Email", which is not associated with immediately stopping the scan process. Therefore, control passes from step 408 to step 414.

At step 414, it is determined whether the scanning requires further confirmation. Security service 116 determines that the action "Email" is an instruction to obtain confirmation of the scan data and associated PSP via email. As such, the scanning requires further confirmation and control passes to step 416. Depending upon a particular implementation, other action codes may be associated with requiring further confirmation for a scanning, e.g., "Fax", "Email/Fax", "Telephone", etc., any of which may require confirmation for a scanning via any channel that may provide such a confirmation. To illustrate, an action "Telephone" may require an automated service to call a number included in action parameters column 380 with auditory information about the scan data. In the description herein, confirmation via email is used as an illustrative example and does not limit the embodiments of the invention thereto.

At step 416, an email is sent to a contact for further confirmation. For example, in response to detecting that the action for security rule 314 is "Email", security service 116 sends an email with information about the scan data, and a request for confirmation to proceed with processing the scan data, to one or more email addresses included in the action parameters (column 380) for security rule 314. Such an email may include one or more of an image of the scan data, an identifier of the authenticated user associated with the scan data, the security classification that has been identified for the scan data, any identified security violation (column 350), information for the associated PSP, etc. Information in action parameters column 380 may be labeled or unlabeled, depending upon a particular implementation.

At step 418, job information is added into a job queue with a status as "To Be Approved". For example, security service 116 creates scan data job 514 with information for the scan data and inserts scan data job 514 into job queue table 500. In one embodiment, after scan data job 514 is inserted into job queue table 500, a graphical user interface is updated with a message indicating that confirmation for the scanning is being sought. For example, security service 116 causes graphical user interface 118 to display a message that indicates that processing the scan data has been delayed pending confirmation of the scanning. Such a message may include one or more of the security classification identified for the scan data (e.g., "Copyrighted"), contact information for a person that the user may contact for assistance, and any other information.

After security service 116 inserts a job for the scan data into the job queue, control passes to step 426 at which point flowchart 400 ends.

As yet another example to illustrate flowchart 400, security classification detector service 152 returns a security classification of "Confidential" to security service 116 in connection with the scan data. At step 404, security service 116 identifies whether one or more of security rules 312-320 (FIG. 3) are associated with the returned security classification. In the case of a "Confidential" security classification, security service 116 identifies security rules 312 and 318 as having a security level (column 340) of "Confidential".

In one embodiment, when multiple rules match the security classification of scan data, security service 116 maps, to the scan data, the first security rule that is identified in the security table as matching the information for the scan data. Depending upon a particular implementation, rules may be evaluated in ascending order of security code (column 330). For a security rule to match information for scan data, both the security level (column 340) and security violation information (column 350) for the security rule must match the appropriate aspects of the scan data and associated information, such as the associated PSP, user information for the user that initiated the data acquisition, etc.

Security violation information for a security rule is information identifying aspects of the scan data and associated information, not involving security classifications, that further refines the mapping requirements of the security rule to the scan data. Security violation information may identify any aspect of scan data, PSP, associated user information, etc., that is not derived from a security classification, including one or more of particular destination information (from the PSP), a size of the scan data, a user identifier, and a user group to which the user belongs, etc.

According to this embodiment, security service 116 evaluates whether security rule 312 matches information for the scan data before evaluating security rule 318. Security service 116 determines that security rule 312 includes security violation information (column 350). The security violation information for security rule 312 indicates that scan data that maps to this security rule is associated with a PSP that contains an external email address. As such, security service 116 determines whether the PSP selected for the scan data contains an external email as a destination. If it does, then security rule 312 is mapped to the scan data.

If not, then security service 116 determines that security rule 312 does not map to the scan data and proceeds to the next security rule (318) that has the appropriate security level. Security service 116 determines that security rule 318 does not include security violation information and, thus, no further evaluation of security rule 318 is needed to map security rule 318 to the scan data.

In another embodiment, when multiple rules match the security classification of scan data, security service 116 first attempts to map, to the scan data, a security rule that matches the security classification of the scan data and also includes security violation information (column 350). If there is no security rule with security violation information that maps to the scan data, then security service attempts to map, to the scan data, a security rule that matches the security classification of the scan data and that does not include security violation information. In this embodiment, a security rule that is more specifically tailored to the scan data via security violation information is given preference over a security rule that is more general.

For purposes of the example, security service 116 maps security rule 312 to the scan data. Since the security classification of the scan data is defined in security table 300, control passes to step 408, where it is determined whether the scanning needs to be stopped. Security service 116 determines that the action (column 360) for security rule 312 is "Email", which is not associated with immediately stopping the scan process. Therefore, control passes from step 408 to step 414 and proceeds as describe above in connection with security rule 314.

As yet another example to illustrate flowchart 400, security classification detector service 152 returns a security classification of "Sensitive" to security service 116 in connection with the scan data. At step 404, security service 116 identifies whether one or more of security rules 312-320 (FIG. 3) are associated with the returned security classification. In the case of a "Sensitive" security classification, security service 116 identifies security rule 320 as having a security level (column 340) of "Sensitive".

Since the security classification of the scan data is defined in security table 300, control passes to step 408, where it is determined whether the scanning needs to be stopped. Security service 116 determines that the action (column 360) for security rule 320 is "Notify-Fax", which is not associated with immediately stopping the scan process. Therefore, control passes from step 408 to step 414.

At step 414, it is determined whether the scanning requires further confirmation. Security service 116 determines that the action "Notify-Fax" associated with security rule 320 does not require further confirmation prior to proceeding with processing the scan data. As such, control passes from step 414 to step 420.

At step 420, it is determined whether the scanning requires notification. Security service 116 determines that the action "Notify-Fax" associated with security rule 320 requires notification to a fax number in the action parameters (column 380) for the rule. As such, the scanning requires notification and control passes to step 422. Other actions may require notification at step 420, including "Notify-Telephone", "Notify-Email", "Notify-Text", etc. Notifications may be sent in a manner similar to a confirmation request, described in further detail below, but do not include a mechanism to allow the recipient to confirm or deny processing the scan data.

At step 422, notification is sent as indicated by the action for the security rule. For example, security service 116 sends a fax to the fax number in the action parameters (column 380) for security rule 320. The fax may include information about the scanning, including one or more of: an image of the scanned document; an identifier of the user that initiated the scan; information from the PSP associated with the scan; etc. However, because a "Notify-Fax" action does not require confirmation, no mechanism is provided to allow the recipient of the fax to confirm or deny processing of the scan data. Control then passes from step 422 to step 424.

At step 424, job information is added into a job queue with a status as "Ready". For example, security service 116 creates scan data job 512 with information for the scan data and inserts scan data job 512 into job queue table 500. After security service 116 inserts a job for the scan data into the job queue, control passes to step 426 at which point flowchart 400 ends.

Job Handler Service

In one embodiment, job handler service 119 monitors job queue table 500 and executes actions associated with the status of the job. Job handler service 119 may be a distinct service in DSM device 110, or may be part of security service 116.

Figure 6:
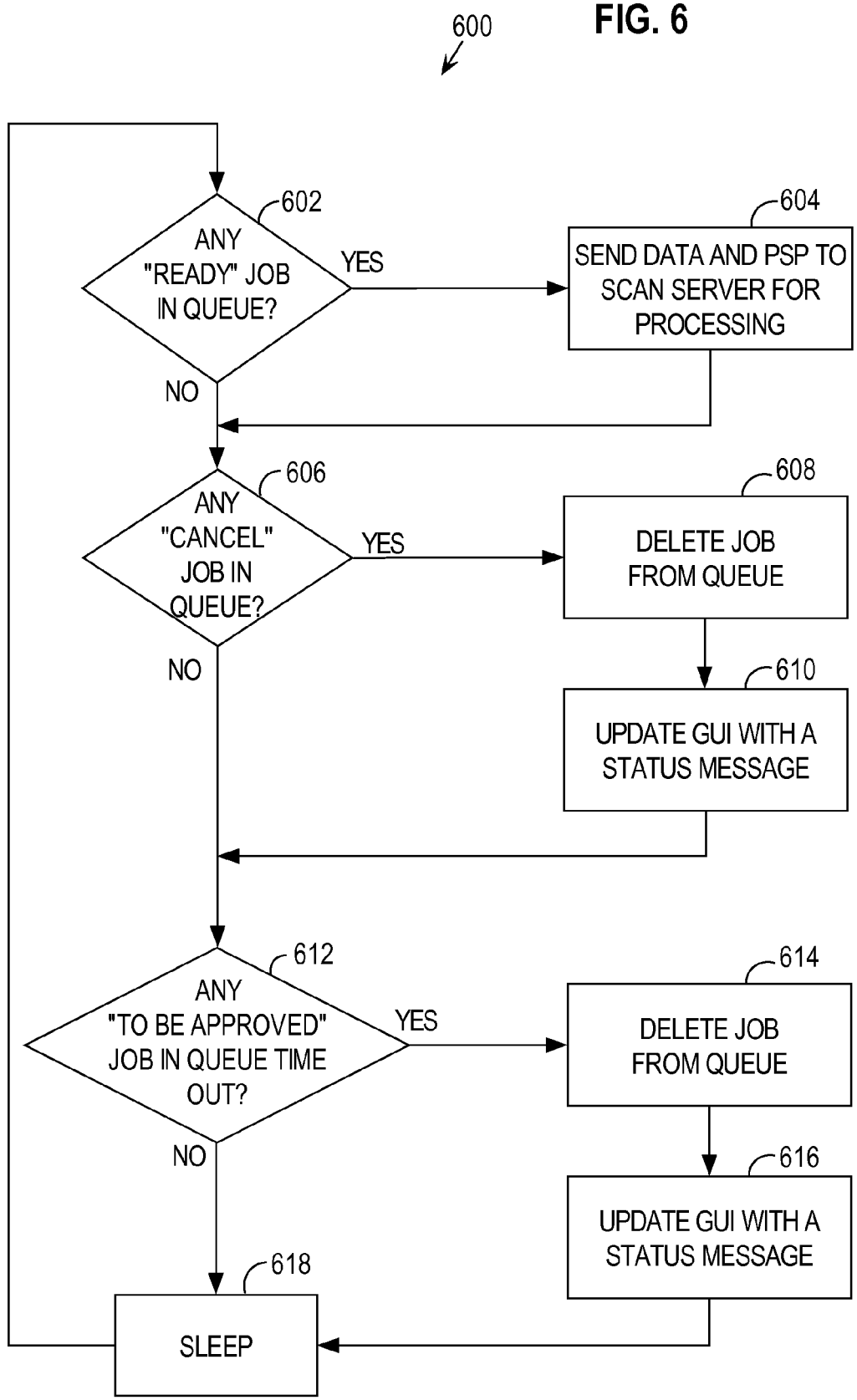
FIG. 6 illustrates a flowchart for monitoring a job queue and dispatching jobs therein.

FIG. 6 illustrates a flowchart 600 for monitoring a job queue and dispatching jobs therein. At step 602, it is determined whether any "Ready" job is in the queue. For example, in job queue table 500 (FIG. 5), scan data job 512 has a status (column 560) of "Ready". Since job queue table 500 includes at least one "Ready" job, control passes to step 604.

At step 604, the scan data and PSP associated with each of the one or more "Ready" jobs in the job queue are sent to a scan server for processing. Within embodiments of the invention, any service running on DSM device 110 may send information for the scan data and PSP to a scan server for processing, including Job handler service 119, security service 116, scan service 114, DSM support service 112, etc.

To illustrate one embodiment, job handler service 119 sends information for the scan data and PSP to scan server 122. To illustrate another embodiment, job handler service 119 notifies DSM support service 112 of the "Ready" job. DSM support service 112 retrieves the information to be sent to scan server 122 for the "Ready" job and sends the information for the "Ready" job to scan server 122. To illustrate yet another embodiment, job handler service 119 sends the scan data and PSP to DSM support service 112, e.g., via an API call, which notifies DSM support service 112 of the "Ready" job and obviates the need for DSM support service 112 to retrieve the scan data information. DSM support service 112 sends the received scan data and PSP to scan server 122. Scan server 122 processes the scan data and dispatches at least a portion of the scan data to the destinations defined in the accompanying PSP. When information for a job has been sent to the scan server, the job is deleted from the job queue.

If no jobs in the job queue have a "Ready" status, or after performance of step 604, control passes to step 606. At step 606, it is determined whether any job in the job queue has a status of "Cancel". For example, scan data job 516 in job queue table 500 has a status (column 560) of "Cancel". Since one or more jobs in job queue table 500 have a status of "Cancel", control passes to step 608 at which point the "Cancel" jobs are deleted from the job queue. For example, job handler service 119 deletes scan data job 516 from job queue table 500 without performing any other actions for the job.

At step 610, a graphical user interface is updated with a status message. For example, job handler service 119 causes a message to be displayed at graphical user interface 118 indicating that the job has been cancelled. Such a message may include other information, including an image of the scan data, depending upon a particular implementation.

If there are no "Cancel" jobs in the job queue, or after performance of step 610, control passes to step 612. At step 612, it is determined whether any job in the job queue with a status of "To Be Approved" has timed out. To illustrate, an administrator may set an amount of time that a job, which is pending approval (i.e., with a status of "To Be Approved"), may remain in the job queue. Once a job that is pending approval has been in the job queue for at least the allotted amount of time, the job is considered timed out. For example, job handler service 119 determines that scan data job 514 of job queue table 500 has a status "To Be Approved" and compares the amount of time that has passed since the job was created, as recorded in create time column 580, with the amount of time that the job may be allowed to remain in the queue. If the job has exceeded this allotted amount of time, then the job has timed out and control passes to step 614.

At step 614, the job that has timed out is deleted from the job queue. For example, scan data job 514 is determined to have timed out and job handler service 119 deletes scan data job 514 from job queue table 500.

At step 616, a graphical user interface is updated with a status message. For example, job handler service 119 causes a message to be displayed at graphical user interface 118 indicating that scan data job 514 has timed out and has been deleted from the queue. Such a message may include information from the scan data and/or PSP selected for the scan data. Furthermore, an email may be sent to the user that originated the job to notify the user that the job timed out and been cancelled. If a job with a status of "To Be Approved" is not timed out, then the job remains in the job queue.

If no "To Be Approved" jobs in the job queue have timed out, or after performance of step 616, control passes to step 618. At step 618, job handler service 119 sleeps for any amount of time, e.g., determined by an administrator, and then control automatically passes to step 602.

Confirmation Requests

As previously indicated, when a job is placed in the job queue with a status of "To Be Approved", a communication is sent via the format indicated by the applicable security rule. For example, security rule 314 requires that a confirmation request email is sent to a contact indicated in the action parameters (column 380) for the rule. The recipient of the confirmation request email may confirm or deny processing of the scan data via any method that allows the recipient to communicate the confirmation or denial to security service 116. For example, the confirmation request email may include a voting mechanism whereby the recipient can communicate to security service 116 a "yes" to confirm processing the scan data or a "no" to deny processing the scan data. As another example, the recipient may respond to the confirmation request email with text that indicates the confirmation or denial, which text may be parsed by security service 116 or any other service. As yet another example, the confirmation request email may include hyperlinks or visual controls which, when activated, communicate a confirmation or denial of processing the scan data to security service 116.

A security rule may require a confirmation request fax be sent to a fax number in the associated action parameters (column 380). Such a fax may include an image of the scan data, the security classification associated with the scan data, etc. Again, the recipient of the confirmation request fax may confirm or deny processing of the scan data via any method that allows the recipient to communicate the confirmation or denial to security service 116. For example, the recipient may fax a page with textual instructions to confirm or deny processing the scan data, which may be parsed by security service 116 or any other service.

A security rule may require a confirmation request telephone call be made to a telephone number in the associated action parameters (column 380). As previously indicated, the confirmation request telephone call may be placed by an automated service and provide auditory information about the scan data. This auditory information may include the security classification of the data, an identifier of the user that caused the scan data to be acquired, etc. Again, the recipient of the confirmation request telephone call may confirm or deny processing of the scan data via any method that allows the recipient to communicate the confirmation or denial to security service 116. For example, the recipient of the telephone call may confirm or deny of processing the scan data via pressing a particular button on the telephone corresponding to confirmation or denial. As another example, the telephone call recipient may speak a particular phrase to the automated service, which is translated into a confirmation or denial using voice recognition.

A security rule may require a confirmation request text message be sent to a telephone number in the associated action parameters (column 380). The confirmation request text message may include a description of the security classification of the data, an identifier of the user that caused the scan data to be acquired, etc. The recipient of the confirmation request text message may confirm or deny processing of the scan data via any method that allows the recipient to communicate the confirmation or denial to security service 116. For example, the recipient of the text message may confirm or deny of processing the scan data via a reply text message with the text "confirm" or "deny".

Furthermore, a security rule may require a confirmation request message be sent to an account identified in the associated action parameters (column 380). Such an account may be a general-purpose social media account or a company-based social media account, etc. The confirmation request message may include a description of the security classification of the data, an identifier of the user that caused the scan data to be acquired, etc. The recipient of the confirmation request message may confirm or deny processing of the scan data via any method that allows the recipient to communicate the confirmation or denial to security service 116. For example, the recipient of the message may confirm or deny of processing the scan data via a reply message with the text "confirm" or "deny". As another example, the confirmation request message may include hyperlinks or visual controls which, when activated, communicate a confirmation or denial of processing the scan data to security service 116

Once security service 116 receives confirmation or denial of processing the scan data, then security service 116 changes the status of the associated job in the job queue to reflect a "Ready" status, or "Cancel" status, respectively. For example, security service 116 receives a confirmation of processing the scan data for scan data job 514 in job queue table 500. Security service 116 changes the status (column 560) and status code (column 570) of scan data job 514 to a "Ready" status. The next time job handler service 119 checks for jobs with a status as "Ready", scan data job 514 will be processed accordingly.

As another example, security service 116 receives a denial of processing the scan data for scan data job 514 in job queue table 500. Security service 116 changes the status (column 560) and status code (column 570) of scan data job 514 to a "Cancel" status. The next time job handler service 119 checks for jobs with a status as "Cancel", scan data job 514 will be deleted from job queue table 500 accordingly.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
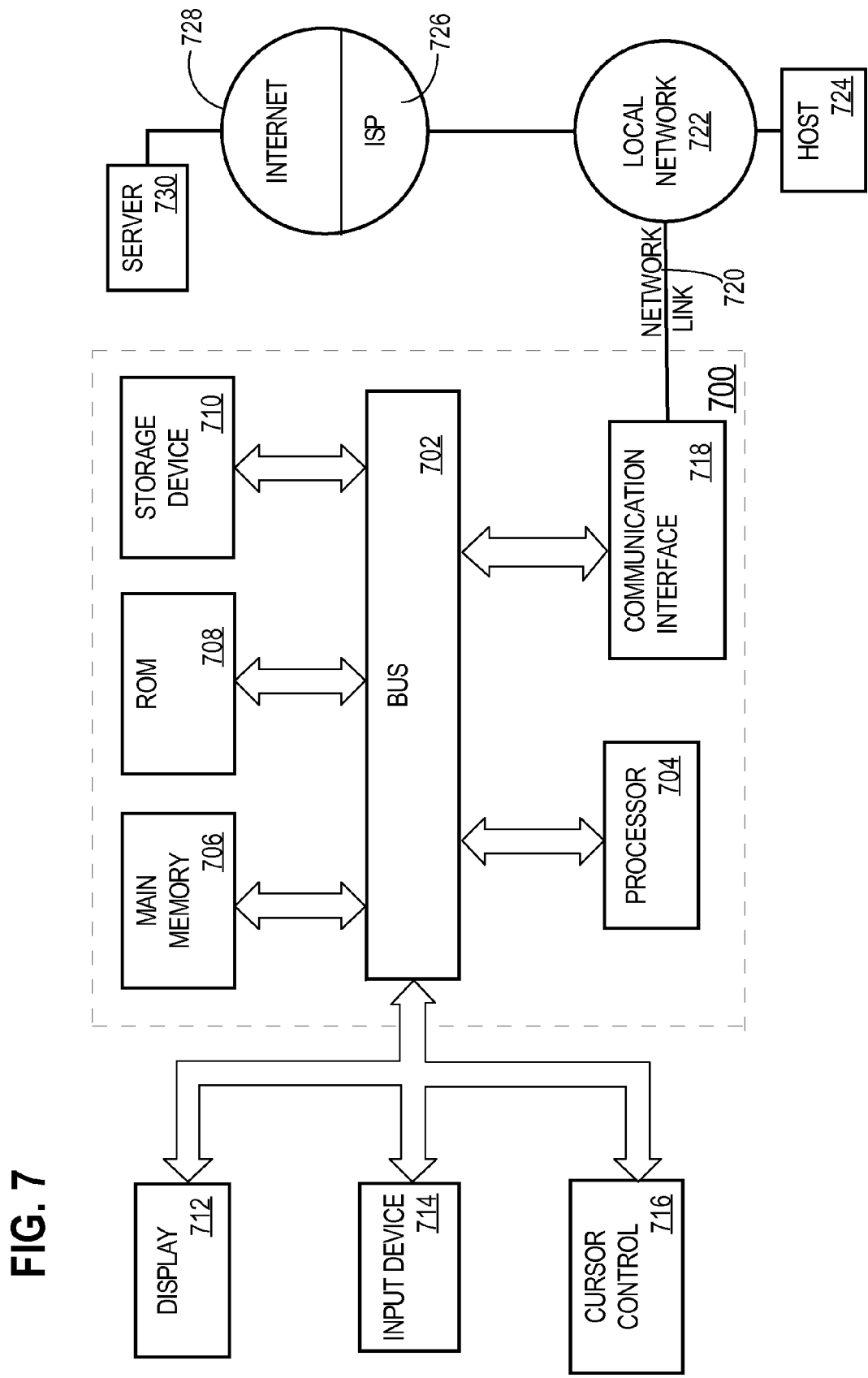
FIG. 7 is a block diagram of a computer system on which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A scanning device comprising:
    a distributed scan management service that implements a distributed scan device protocol and a distributed scan processing protocol;
    wherein the distributed scan management service is configured to receive information for post scan processing instructions;
    a scan service configured to:
    scan a document, and
    generate scan data based on the document scan;
    a security handler service configured to:
    identify a security classification, for the scan data, based, at least in part, on at least a portion of the scan data;

identify two or more security rules that are applicable to the scan data based on an association of each of the two or more security rules with the security classification for the scan data;

wherein at least a particular security rule, of the two or more security rules, is associated with a security violation requirement;

determine that the security violation requirement, associated with the particular security rule, is satisfied by at least a portion of one or more of:

the scan data, user data for a user that is associated with the scan data, or the post scan processing instructions;

in response to determining that the security violation requirement associated with the particular security rule is satisfied, identify the particular security rule from the two or more security rules to apply to the scan data; and in response to identifying the particular security rule, apply the particular security rule to the scan data by performing one or more actions for the scan data;

wherein the one or more actions are indicated by the particular security rule;

add a job for the scan data associated with the security classification into a job queue; and wherein the job includes a status for the scan data associated with the security classification; and a job handler service configured to:

identify the status of the job in the job queue; and perform one or more actions based on the status of the job, comprising:

responsive to identifying the status of the job as a ready status:

cause the scan data and information for the post scan processing instructions to be sent to a scan server, and remove the job from the job queue; and responsive to identifying the status of the job as a cancel status:

remove the job from the job queue.

2. The scanning device of claim 1, wherein adding the job for the scan data into the job queue is an action of the one or more actions indicated by the particular security rule.

3. The scanning device of claim 2, wherein a second action of the one or more actions is requesting confirmation for processing the scan data, and wherein the security handler service is further configured to:

receive confirmation for processing the scan data; and change the status of the job in the job queue to reflect the confirmation for processing the scan data.

4. The scanning device of claim 1, wherein the security violation requirement for the particular security rule does not identify the security classification.

5. The scanning device of claim 4, wherein the security violation requirement for the particular security rule identifies one or more of:

particular destination information in the post scan processing instructions, a size of the scan data, a user identifier, or a user group to which the user belongs.

6. The scanning device of claim 1, wherein the distributed scan device protocol and the distributed scan processing protocol are implemented using Web services.

7. One or more non-transitory computer-readable media storing instructions which, when processed by one or more processors, cause:

a distributed scan management service executing on a scanning device and:

implementing a distributed scan device protocol and a distributed scan processing protocol, and receiving information for post scan processing instructions;

a scan service executing on the scanning device and:

scanning a document, and generating scan data based on the document scan;

a security handler service executing on the scanning device and:

identifying a security classification, for the scan data, based, at least in part, on at least a portion of the scan data;

identifying two or more security rules that are applicable to the scan data based on an association of each of the two or more security rules with the security classification for the scan data;

wherein at least a particular security rule, of the two or more security rules, is associated with a security violation requirement;

determining that the security violation requirement, associated with the particular security rule, is satisfied by at least a portion of one or more of:

the scan data, user data for a user that is associated with the scan data, or the post scan processing instructions;

in response to determining that the security violation requirement associated with the particular security rule is satisfied, identifying the particular security rule from the two or more security rules to apply to the scan data; and in response to identifying the particular security rule, applying the particular security rule to the scan data by performing one or more actions for the scan data;

wherein the one or more actions are indicated by the particular security rule;

adding a job for the scan data associated with the security classification into a job queue; and wherein the job includes a status for the scan data associated with the security classification; and a job handler service executing on the scanning device and:

identifying the status of the job in the job queue;

performing one or more actions based on the status of the job, comprising:

responsive to identifying the status of the job as a ready status:

causing the scan data and information for the post scan processing instructions to be sent to a scan server, and removing the job from the job queue; and responsive to identifying the status of the job as a cancel status:

removing the job from the job queue.

8. The one or more non-transitory computer-readable media of claim 7, wherein: adding the job for the scan data into the job queue is an action of the one or more actions indicated by the particular security rule.

9. The one or more non-transitory computer-readable media of claim 8, wherein a second action of the one or more actions is requesting confirmation for processing the scan data, and wherein the instructions further comprise instructions which, when processed by the one or more processors, cause the security handler service to:

receive confirmation for processing the scan data; and change the status of the job in the job queue to reflect the confirmation for processing the scan data.

10. The one or more non-transitory computer-readable media of claim 7, wherein the security violation requirement for the particular security rule does not identify the security classification.

11. The one or more non-transitory computer-readable media of claim 10, wherein the security violation requirement for the particular security rule identifies one or more of:
- particular destination information in the post scan processing instructions,
- a size of the scan data,
- a user identifier, or
- a user group to which the user belongs.

12. The one or more non-transitory computer-readable media of claim 7, wherein the distributed scan device protocol and the distributed scan processing protocol are implemented using Web services.

13. A computer-executed method comprising:
- receiving information for post scan processing instructions;
- scanning a document at a scanning device;
- wherein the scanning device implements a distributed scan device protocol and a distributed scan processing protocol,
- generating scan data based on the document scan;
- identifying a security classification, for the scan data, based, at least in part, on at least a portion of the scan data;
- identifying two or more security rules that are applicable to the scan data based on an association of each of the two or more security rules with the security classification for the scan data;
- wherein at least a particular security rule, of the two or more security rules, is associated with a security violation requirement;
- determining that the security violation requirement, associated with the particular security rule, is satisfied by at least a portion of one or more of:
- the scan data,
- user data for a user that is associated with the scan data, or
- the post scan processing instructions;
- in response to determining that the security violation requirement associated with the particular security rule is satisfied, identifying the particular security rule from the two or more security rules to apply to the scan data, and
- in response to identifying the particular security rule, applying the particular security rule to the scan data by performing one or more actions for the scan data;
- wherein the one or more actions are indicated by the particular security rule;
- adding a job for the scan data associated with the security classification into a job queue;
- wherein the job includes a status for the scan data associated with the security classification;
- identifying the status of the job in the job queue;
- performing one or more actions based on the status of the job, comprising:
- responsive to identifying the status of the job as a ready status:
- causing the scan data and information for the post scan processing instructions to be sent to a scan server, and
- removing the job from the job queue; and
- responsive to identifying the status of the job as a cancel status:
- removing the job from the job queue.

14. The computer-executed method of claim 13, wherein adding the job for the scan data into the job queue is an action of the one or more actions indicated by the particular security rule.

15. The computer-executed method of claim 14, wherein a second action of the one or more actions is requesting confirmation for processing the scan data, and wherein the method further comprises:
- receiving confirmation for processing the scan data; and
- changing the status of the job in the job queue to reflect the confirmation for processing the scan data.

16. The computer-executed method of claim 13, wherein the security violation requirement for the particular security rule does not identify the security classification.

17. The computer-executed method of claim 16, wherein the security violation requirement for the particular security rule identifies one or more of:
- particular destination information in the post scan processing instructions,
- a size of the scan data,
- a user identifier, or
- a user group to which the user belongs.

* * * * *